July 23, 1968   K. B. PERKINS   3,393,753
SUBSOILER IMPROVEMENT
Filed Oct. 18, 1965

INVENTOR.
KENDALL B. PERKINS
BY *Elliott & Pastoriza*
ATTORNEYS.

United States Patent Office 3,393,753
Patented July 23, 1968

3,393,753
SUBSOILER IMPROVEMENT
Kendall B. Perkins, 10636 Eastborne,
Los Angeles, Calif. 90024
Filed Oct. 18, 1965, Ser. No. 497,190
2 Claims. (Cl. 172—700)

ABSTRACT OF THE DISCLOSURE

A subsoiler including a vertical standard for making a vertical cut in the ground is provided. The subsoiler structure includes in combination a pair of upwardly and rearwardly diverging wings attached to the vertical standard near the top thereof, each of the wings having a convex front surface and including bottom edge portions converging downwardly towards the standard on both sides so that a more or less V-shaped shallow trough is provided on either side of the vertical cut thereby facilitating draining of water into the cut.

---

This invention relates generally to earth working devices and more particularly to an improved subsoiler for breaking up hard-packed soil.

The advantages of using subsoilers to break up hard-packed subsoil layers in agricultural operations are well known. Among the principal advantages are: greater soil depth is provided for storage of moisture; surface and internal drainage is improved; and runoff and erosion losses are reduced.

Although presently available subsoilers often produce the above advantages, they nonetheless leave the surface of the soil in a configuration which does not allow maximum collection of moisture into the vertical cut produced by the subsoiler. As presently constructed, subsoilers penetrate to the subsoil layer and break or shatter the subsoil into relatively small lumps. This operation causes the surface of the soil adjacent to the vertical cut to be raised into a ridge above the adjacent unworked surface, resulting in the opening of the cut being above the adjacent ground surface. It is therefore apparent that a portion of rain water falling at or near the cut will drain away from the cut and be lost as runoff.

With the foregoing in mind, it is accordingly a primary object of this invention to provide a subsoiler having a novel soil-shaping device attached thereto which shapes the soil so as to increase the water retention capability thereof to the end that loss of moisture is reduced to a minimum.

More particularly, it is an object to provide a novel attachment for a subsoiler which accomplishes the foregoing object by shaping or grading the surface of the soil into a gently sloping, V-shaped ditch, the surfaces initially being no higher than the surrounding terrain and converging downwardly toward the vertical cut made by the subsoiler so that marginal areas defining the opening of the cut will not block water from entering the cut.

Another object is to provide a novel attachment for a subsoiler which may be mounted on the subsoiler in a plurality of vertically spaced positions wherein the depth of penetration of the subsoiler may be varied as desired.

Another object is to provide a novel attachment for a subsoiler which is of rugged and simplified construction.

Briefly, these and many other objects and advantages of this invention are attained by providing a conventional subsoiler wth an attached device including a pair of diverging wing members secured to the rear of the standard of the subsoiler and positioned so as to shape the surface of the ground into a gently sloped, V-shaped ditch converging downwardly toward a vertical cut made by the standard penetrating into the ground.

The standard is preferably provided with means for mounting the wing members in a plurality of vertically spaced positions thus allowing the standard of the subsoiler to penetrate into the ground to selected depths as desired.

A better understanting of the invention will now be had by referring to a preferred embodiment thereof as illustrated in the accompanying drawings, in which.

Figure 1:
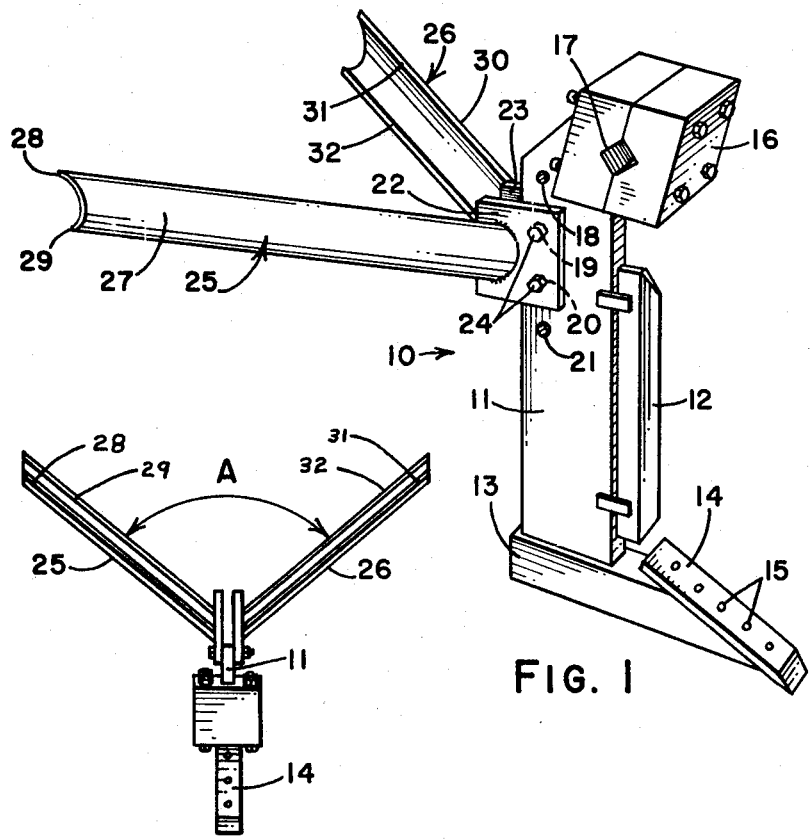
FIGURE 1 is a perspective view of the improved subsoiler of this invention.

Referring first to FIGURE 1, there is shown a subsoiler 10 including a vertical standard 11 having a cutting shin 12 secured along the front edge thereof. Secured to the bottom of the standard 11 is a foot member 13 upon which is mounted a chisel point 14 by means of bolts 15. A mounting clamp 16 is secured to the top portion of the standard 11 and includes a transverse opening 17 adapted to receive a tool bar connected to a tractor, for pulling the subsoiler to the right.

In accordance with the invention, the standard 11 is provided with a series of aligned, evenly spaced openings 18, 19, 20, and 21 defined therethrough along the upper portion of its rear edge. A pair of plate members 22 and 23 are positioned on opposite sides, respectively, of the standard 11 and are secured thereto by means of a pair of bolts 24 extending through a registering pair of openings 19 and 20, as shown.

Since the openings 18–21 are evenly spaced, the plates 22 and 23 may be attached to the standard 11 in at least three vertically spaced positions; that is, the plates may be positioned wherein the bolts 24 are inserted through adjacent pairs of openings 18 and 19, 19 and 20, and 20 and 21, respectively.

As shown, a pair of wing members 25 and 26 are integrally connected to the plates 22 and 23, respectively, as by welding, for example. The wing member 25 is formed with a curvilinear frontal surface 27 preferably parabolic in cross-section, extending along its longitudinal extent and terminating in top and bottom longitudinal edges 28 and 29, respectively, extending along the rear of the wing. In a similar manner, the wing member 26 includes a curvilinear frontal surface 30 terminating in top and bottom edges 31 and 32, respectively.

Figure 2:
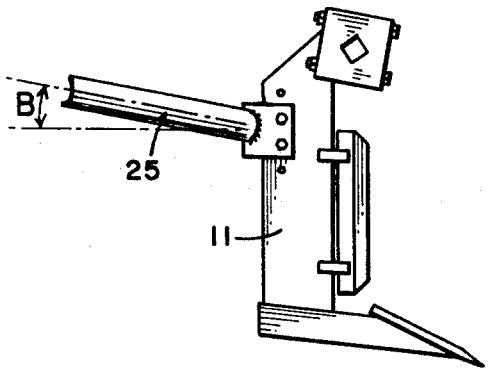
FIGURE 2 is a plan view of the subsoiler shown in FIGURE 1.

Referring now to FIGURE 2, it will be seen that the wing members 25 and 26 extend outwardly and reawardly with respect to the standard 11 and diverge from each other as indicated by the angle A as shown.

It will also be seen that the bottom edges 29 and 32, respectively, extend further toward the rear than do the top edges 28 and 30, thereby providing the above-mentioned parabolic cross-sectional configuration of each of the wings 25 and 26. Each of the bottom edges thus provides a substantially flat surface which grades and compresses the surface of the soil in a manner to become clear as the description proceeds.

Figures 3, 4:
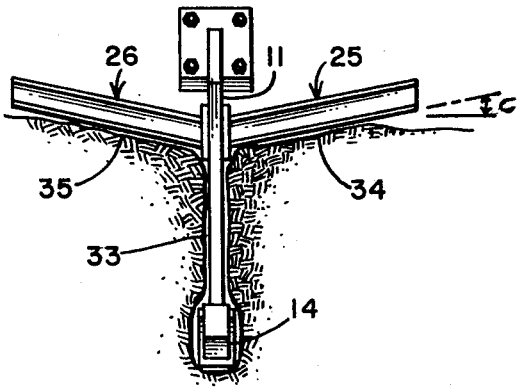
FIGURE 3 is a side elevational view of the improved subsoiler.
FIGURE 4 is an end elevational view of the subsoiler making a cut into the surface of the ground.

In FIGURE 3, it will be seen that the wing members extend upwardly from the horizontal at an angle B as shown.

FIGURE 4 illustrates the manner in which the subsoiler penetrates the subsoil in conjunction with the manner in which the wing members shape and compress the surface of the ground. As shown, the bottom edges of the wing members extend upwardly from the horizontal at an angle C.

In operation and with reference first to FIGURE 1, the subsoiler is coupled to a tool bar of a tractor by attaching the mounting clamp 16 thereto in the conventional manner so that the tractor will pull the subsoiler to the right. As shown in FIGURE 4, the subsoiler is lowered into the ground with the chisel point 14 and standard 11 being pulled therethrough thus making a generally vertical cut 33 into the subsoil which causes the subsoil to break and shatter. In FIGURE 4, the direction of motion is into the plane of the drawing.

The wing members 25 and 26 move along the surface of the ground and grade and compress the loosened soil into a gently sloping, V-shaped ditch defined by the tapered surfaces 34 and 35 located on opposite sides, respectively, of the vertical cut 33 toward which the surfaces 34 and 35 converge.

As a result of the foregoing operation, the subsoil is not only broken and shattered but is formed into a configuration adjacent both sides of the vertical cut which permits water to flow toward and into the cut rather than away from the cut as was the case with prior subsoiler devices.

It is apparent that the depth of the subsoiling operation may be easily adjusted by coupling the wing members to the standard at any one of the selected positions.

Various changes falling within the scope and spirit of this invention will occur to those skilled in the art. The subsoiler structure is therefore not to be though of as limited to the specific embodiment set forth.

What is claimed is:

1. An improved subsoiler comprising, in combination: a vertical standard adapted to make a vertical cut into the ground as it is moved thereacross; and a pair of upwardly and rearwardly diverging wings attached to a rear portion of said standard near the top thereof; each of said wings including a curvilinear frontal convex surface extending along the length thereof and terminating in bottom edge portions converging downwardly toward said standard on both sides thereof, whereby said wings form the surface of the soil into tapered surfaces converging toward the vertical cut made by said standard.

2. An improved subsoiler comprising, in combination: a vertical standard having a cutting edge on the front thereof adapted to make a vertical cut into the ground as it is moved thereacross, said standard having a series of aligned, evenly spaced openings defined therethrough along its rear edge near the top portion thereof; a pair of plate members secured to opposite sides of said standard by means of bolts extending through an adjacent pair of said openings; and a longitudinal wing member integrally attached to each of said plate members extending upwardly, outwardly, and rearwardly therefrom, each of said wing members including a curvilinear frontal convex surface terminating in top and bottom longitudinal edges along the rear thereof, said bottom edges converging downwardly toward said standard, whereby said wing members form the surface of the ground into tapered surfaces converging toward the vertical cut made by said standard.

References Cited

UNITED STATES PATENTS

| | | | |
|---|---|---|---|
| 475,461 | 5/1892 | Miller | 172—722 |
| 970,818 | 9/1910 | Harryman | 37—193 |
| 3,002,574 | 10/1961 | Padrick. | |

FOREIGN PATENTS

| | | |
|---|---|---|
| 505,252 | 8/1954 | Canada. |
| 253,642 | 11/1912 | Germany. |

ABRAHAM G. STONE, *Primary Examiner.*

R. C. HARRINGTON, *Assistant Examiner.*